(12) United States Patent
Nave et al.

(10) Patent No.: US 9,530,123 B1
(45) Date of Patent: *Dec. 27, 2016

(54) PREDICTION OF COMPONENT MAINTENANCE

(71) Applicant: International Business Machines Corporation, Armonk, NY (US)

(72) Inventors: Shawn M. Nave, Tucson, AZ (US); Anh T. Nguyen, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/043,841

(22) Filed: Feb. 15, 2016

Related U.S. Application Data

(63) Continuation of application No. 14/879,119, filed on Oct. 9, 2015.

(51) Int. Cl.
*G06Q 10/00* (2012.01)
*G06F 19/00* (2011.01)

(52) U.S. Cl.
CPC ............... *G06Q 10/20* (2013.01); *G06F 19/00* (2013.01)

(58) Field of Classification Search
None
See application file for complete search history.

(56) References Cited

U.S. PATENT DOCUMENTS

| | | | |
|---|---|---|---|
| 6,262,863 B1 * | 7/2001 | Ostwald | G11B 15/6835 360/92.1 |
| 6,810,306 B1 * | 10/2004 | Ostwald | G11B 17/225 104/88.02 |
| 7,450,330 B2 * | 11/2008 | Sasaki | G11B 15/6835 360/69 |
| 9,051,695 B2 | 6/2015 | Landes et al. | |
| 2002/0197137 A1 | 12/2002 | Ostwald et al. | |
| 2004/0253081 A1 | 12/2004 | Campbell et al. | |
| 2007/0216771 A1 | 9/2007 | Kumar | |

(Continued)

FOREIGN PATENT DOCUMENTS

| | | |
|---|---|---|
| EP | 0978835 A2 | 2/2000 |
| WO | 2007054491 A3 | 5/2007 |

(Continued)

OTHER PUBLICATIONS

Ehm, Felix, "Development of a Performant Defragmentation Process for a Robotic Tape Library within the CASTOR HSM", Thesis submitted for the degree Diplom-Informatiker (Fachhochschule), University of Applied Sciences Wiesbaden Academic Unit of Information Technology, 129 pages.

(Continued)

*Primary Examiner* — Carlos E Garcia
(74) *Attorney, Agent, or Firm* — Gilbert Harmon, Jr.

(57) ABSTRACT

One or more processors determine wear for a robotic device. The one or more processors divide a direction of travel of a robotic device into zones. Each zone has an associated counter that counts how many times the robotic device has entered a given zone. The one or more processors update a count for a zone in response to the robotic device entering that zone. The one or more processors determine a level of wear for a component associated with the robotic device. The level of wear is based, at least in part, on a total of counts for the zones.

1 Claim, 9 Drawing Sheets

(56) References Cited

U.S. PATENT DOCUMENTS

| | | | |
|---|---|---|---|
| 2010/0004804 A1* | 1/2010 | Anderson | B61K 9/08 701/19 |
| 2011/0125551 A1* | 5/2011 | Peiser | G06Q 30/02 705/7.31 |
| 2011/0172973 A1* | 7/2011 | Richards | G05B 17/02 703/2 |
| 2011/0224823 A1 | 9/2011 | Green et al. | |
| 2013/0272838 A1 | 10/2013 | Holden et al. | |
| 2015/0076834 A1 | 3/2015 | Hartl et al. | |
| 2015/0248636 A1* | 9/2015 | Peters | G06Q 10/0832 705/332 |

FOREIGN PATENT DOCUMENTS

| | | |
|---|---|---|
| WO | 2007065858 A1 | 6/2007 |
| WO | 2010087830 A1 | 8/2010 |

OTHER PUBLICATIONS

"Prediction of Component Maintenance", U.S. Appl. No. 14/879,119, filed Oct. 9, 2015.
IBM Appendix P, list of IBM patents or patent applications treated as related, pp. 1-2.

* cited by examiner

US 9,530,123 B1

PREDICTION OF COMPONENT MAINTENANCE

BACKGROUND OF THE INVENTION

The present invention relates generally to the field of maintenance, and more particularly to determination of part deterioration.

In automated tape libraries a robotic accessor is used to move tape cartridges between different storage slots in the library and tape drives used to read and write the data on the tape cartridges. The robotic accessor is an electro-mechanical system made up of various components that each have a finite life. Certain components such as the cables that are tethered to the robotic accessor flex as the robotic accessor moves within the library. Various collected information can be used to determine if a particular component on the robotic accessor is near the end of its finite life and in need of repair or replacement.

SUMMARY

Embodiments of the present invention provide a method for determining wear for a robotic device. One or more processors divides a direction of travel of a robotic device into a plurality of discrete zones that each have an associated counter that counts how many times the robotic device has entered a given discrete zone. The robotic device is a robotic accessor included in a tape library.

The one or more processors update a count for a first discrete zone in response to the robotic device entering the first discrete zone by: The one or more processors determining whether a movement, which includes the robotic device entering the first discrete zone, at least meets one or both of a first threshold associated with a level of wear and a second threshold associated with a level of wear. The one or more processors responding to a determination that the movement at least meets the first threshold associated with a level of wear by incrementing the count for the first discrete zone. The one or more processors respond to a determination that the movement does not at least meet the second threshold associated with a level of wear by determining that the count of the first discrete zone is not to be incremented.

The one or more processors determines a level of wear for a component associated with the robotic device based, at least in part, on a total of counts for the plurality of discrete zones by: The one or more processors summing counts associated with the plurality of discrete zones to generate a sum of counts. The one or more processors determining whether the sum of counts at least meets a third threshold that indicates whether that a type of maintenance is to be performed on a component of the robotic device.

The one or more processors generating a report indicating the level of wear for a component associated with the robotic device based, at least in part, on a total of counts for the plurality of discrete zones, wherein the report indicates whether the component is in need of replacement. The one or more processors respond to the sum of counts at least meeting the third threshold by sending a message based, at least in part, on the report; thereby indicating that indicates that the type of maintenance is to be performed on a component of the robotic device. The one or more processors scheduling the type of maintenance to be performed on a component of the robotic device based, at least in part, on the report.

DETAILED DESCRIPTION

Figure 1:
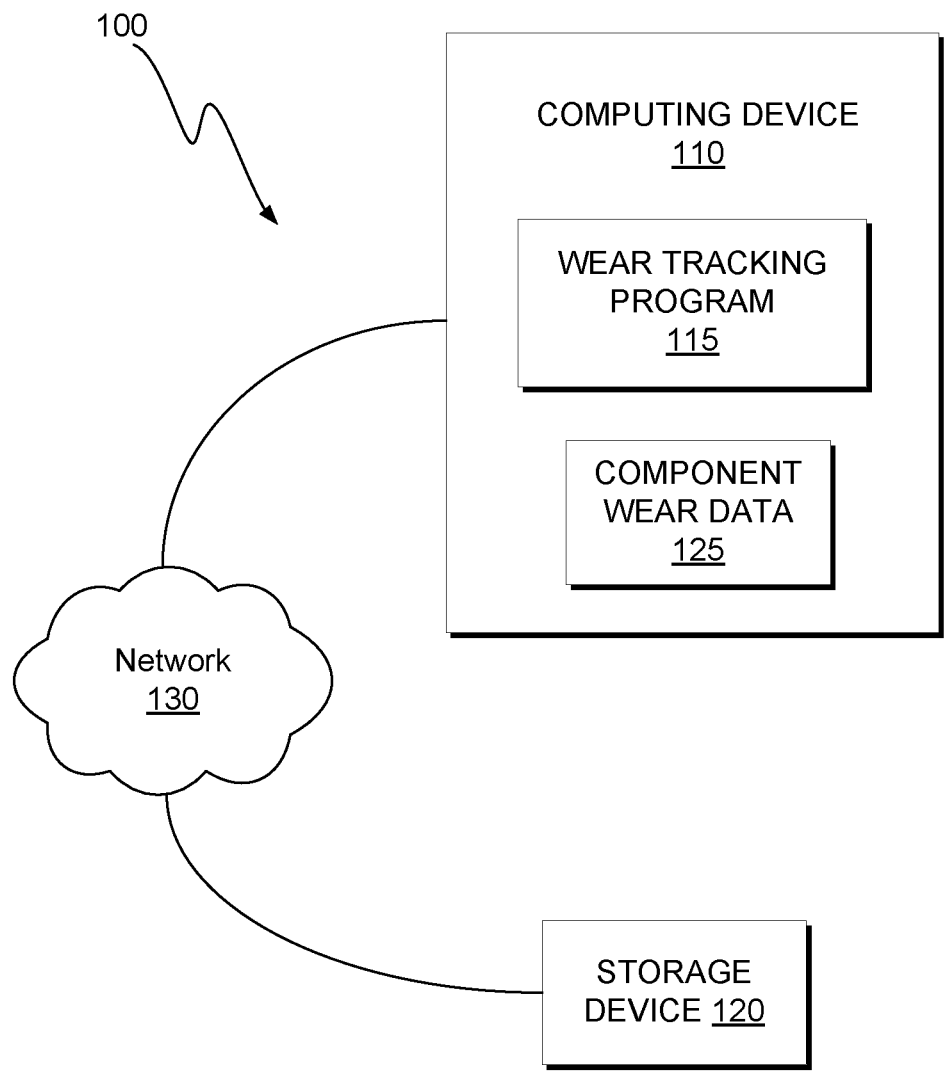
FIG. 1 is a functional block diagram illustrating a component tracking environment, in accordance with an exemplary embodiment of the present invention.

Embodiments of the present invention recognize that in automated tape libraries a robotic accessor is used to move tape cartridges between different storage slots in the library and tape drives used to read and write the data on the tape cartridges. Embodiments of the present invention recognize that in some instances the robotic accessor is an electro-mechanical system made up of various components that each have a finite life. Embodiments of the present invention recognize that in some cases the control system of the tape library keeps useful counts of various mechanical motions in order to determine the total cycle count of different components of the robotic accessor. Embodiments of the present invention recognize that this information can be used to determine if a particular component on the robotic accessor is near the end of its finite life and in need of repair or replacement.

Embodiments of the present invention recognize that some counters in tape libraries include number of get/put cycles, pivot cycles, and horizontal (X) and vertical (Y) distance traveled by the robot. Embodiments of the present invention recognize that such counters do not provide an adequate picture of where the robotic accessor has traveled inside the tape library. Embodiments of the present invention recognize that certain components such as the cables that are tethered to the robotic accessor flex as the robotic accessor moves within the library. Embodiments of the present invention recognize that each segment of the X cable, which corresponds to the horizontal (X) direction of travel, has its own finite life or number of flexes it can endure before failure. Embodiments of the present invention recognize that some robotic accessors that are made with a cable-less design typically have brushes that run on a track to conduct power and/or signal to the robotic accessor. However, embodiments of the present invention recognize that each section of track has its own finite life or number of times that a brush can run on it before it wears out.

Embodiments of the present invention recognize that while certain known counters can be somewhat useful in determining the life of various types of components, they do not always accurately portray the true usage life of a particular segment of a cable or track. For example, if a robotic accessor makes a small number of long moves in a library, the distance traveled counters of the robot would be high, but the number of actual flexes or times running in a particular segment of the library track is very low. Conversely if a robot is performing many short moves in a library, the distance traveled counters of the robot would be low, but the number of actual flexes or times running in a particular segment of the library track would be very high. Furthermore, in another example, the robot may be performing many get/put cycles moving cartridges between storage slots, but the storage slot locations may be all located within the same vertical column. In this example, the put/get cycle counters would be updated significantly when there is no horizontal motion that could cause a component such as the X cable to flex. Embodiments of the present invention provide tracking the actual movement of the robotic accessor within the library so that components that wear in the manner described above can be accurately accounted for and have valid statistics useful for determining wear-out and service procedures.

Embodiments of the present invention recognize that products that contain known counters as mentioned above include small libraries and large libraries ranging from 1U tape libraries to large libraries that can scale to a cartridge capacity in excess of 20,000 cartridges. Embodiments of the present invention recognize that while known counters are useful for certain types of determinations, such as, for example, motor, belt, gear train, or bearing life; other components receive wear that is dependent on the robotic accessor position. As such, known counters do not accurately track the useful life of components receiving wear that is dependent on the robotic accessor position.

The present invention will now be described in detail with reference to the Figures.

FIG. 1 is a functional block diagram illustrating a component tracking environment, generally designated 100, in accordance with one embodiment of the present invention. Component tracking environment 100 includes computing device 110 and storage device 120 connected over network 130. Computing device 110 includes wear tracking program 115 and a local copy of component wear data 125. Note that in some embodiments, storage device 120 includes some or all of the hardware, software and data included in computing device 110 needed to execute wear tracking program 115 and thereby determine the wear for various components included in storage device 120.

In one embodiment, wear tracking program 115 is included as part of the firmware of a computer data storage library. In various embodiments, computing device 110 is a computing device that is one or both of i) incorporated as part of a computer data storage library, and ii) is in communication with the parts, i.e., components, of the computer data storage library such that wear tracking program 115 has access to component wear data 125. In some embodiments, computing device can be a standalone device, a server, a laptop computer, a tablet computer, a netbook computer, a personal computer (PC), or a desktop computer. In another embodiment, computing device 110 represents a computing system utilizing clustered computers and components to act as a single pool of seamless resources. In general, computing device 110 can be any computing device or a combination of devices with access to wear tracking program 115 and component wear data 125 and is capable of executing wear tracking program 115.

Figure 3:
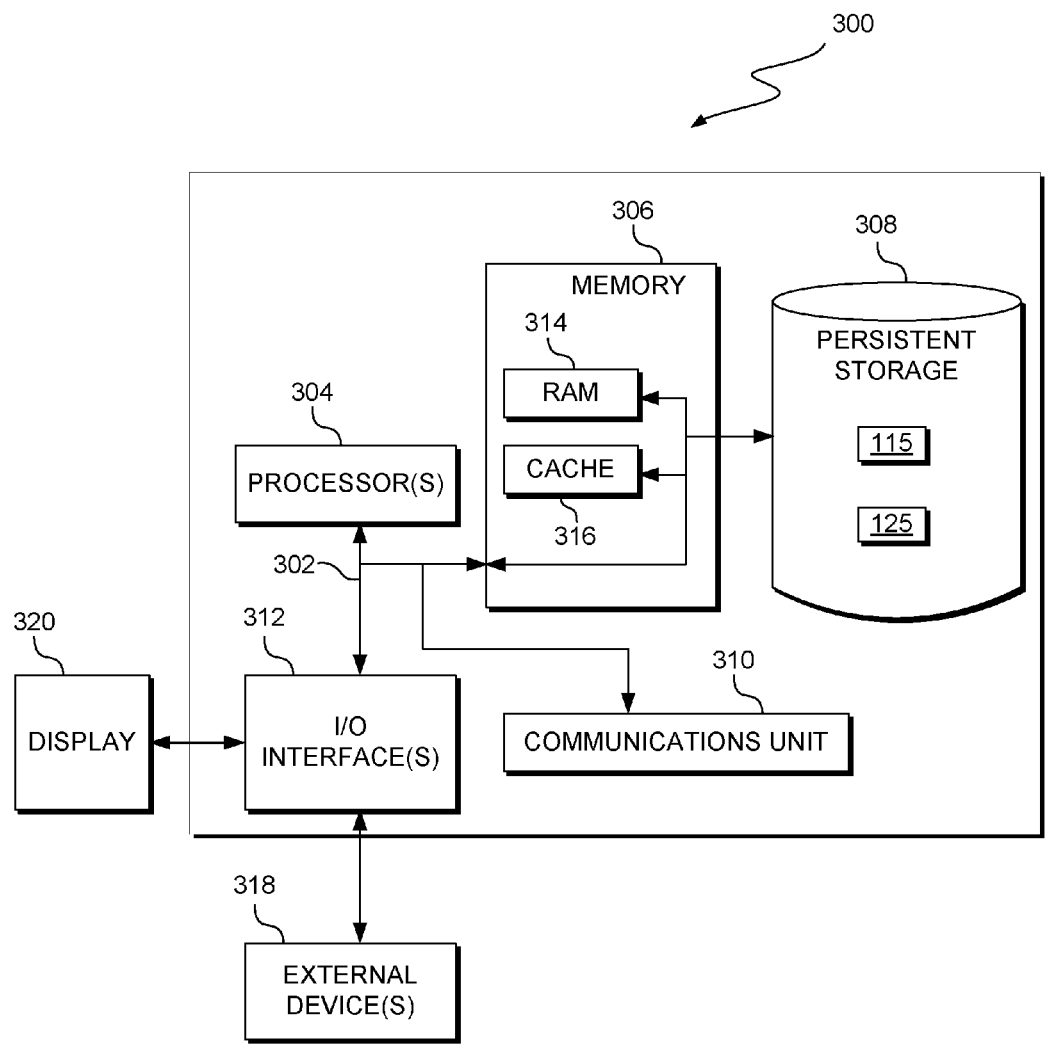
FIG. 3 depicts a block diagram of components of the computing device executing the wear tracking program, in accordance with an exemplary embodiment of the present invention.

Computing device 110 may include internal and external hardware components, as depicted and described in further detail with respect to FIG. 3.

In this exemplary embodiment, wear tracking program 115 and component wear data 125 are stored on computing device 110. However, in other embodiments, wear tracking program 115 and component wear data 125 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between computing device 110, storage device 120, wear tracking program 115, and component wear data 125, in accordance with a desired embodiment of the present invention.

Figure 5:
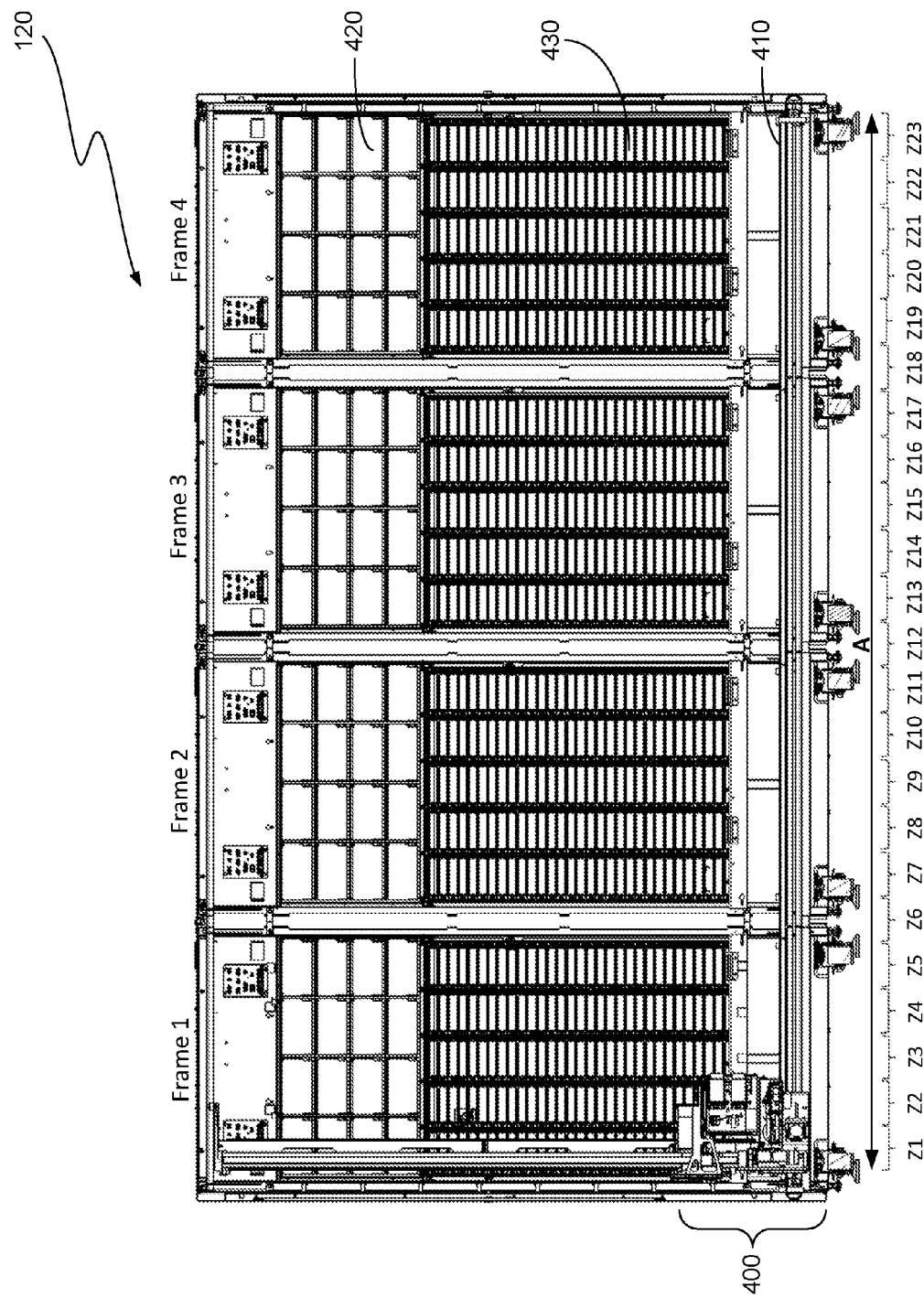
FIGS. 5-8 illustrate side cut-away views of a storage device 120 and increases in the counts for various zones as a robotic accessor of a storage device 120 moves, in accordance with an exemplary scenario and embodiment of the present invention.

In one exemplary embodiment, storage device 120 is a data storage device, such as for example, an automated tape library with a robotic accessor that accesses the various data storage tapes included in the library. In one embodiment, such as the one depicted in FIG. 5, storage device 120 includes a robotic accessor 400 denoted using brackets. Also depicted in FIG. 5 are a plurality of drive bays 420 and storage slots 430. In general, storage device 120 represents a device with moving parts that is capable of generating component wear data 125 and sending that data to computing device 110 for analysis using wear tracking program 115. In one embodiment, such as the one depicted in FIG. 5, storage device 120 includes a number of sensors (not shown) that storage device 120 uses to determine the location and movement of robotic accessor 400. In general, robotic accessor 400 uses signals generated by such sensors to generate data that is sent to computing device 110 and stored as part of component wear data 125. As such, component wear data 125 includes the data needed by wear tracking program 115 to determine the degree of wear for various components included in storage device 120.

Figure 2:
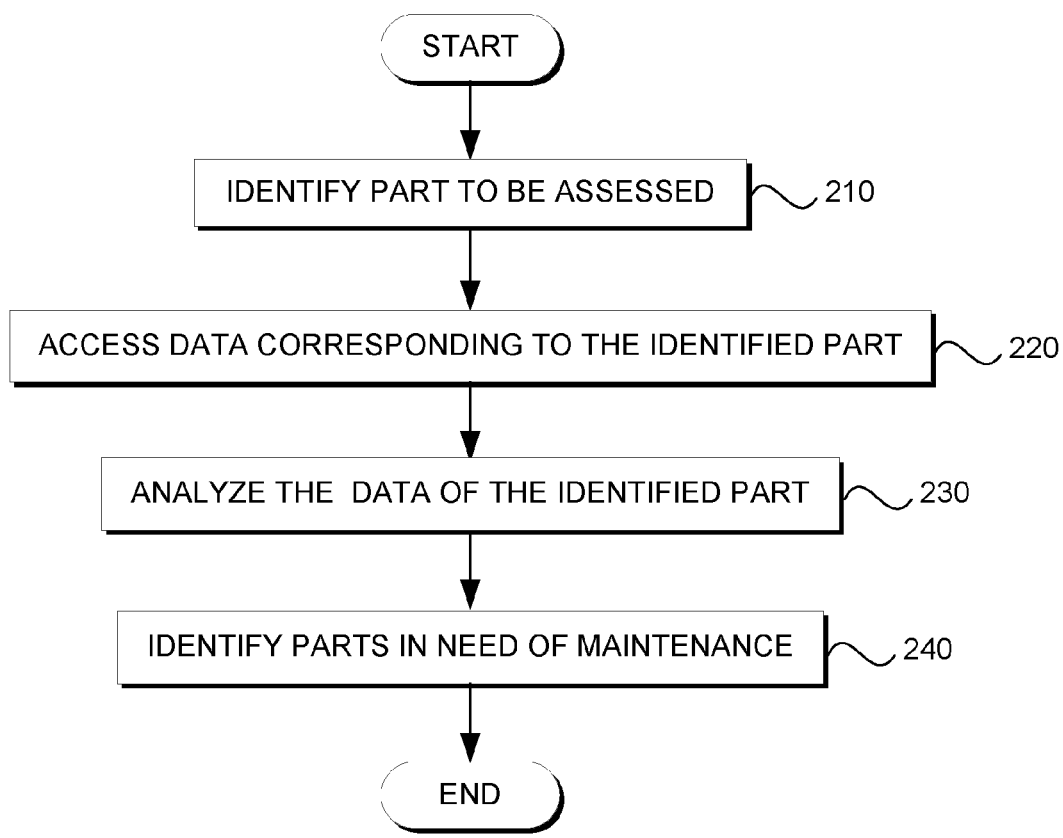
FIG. 2 illustrates operational processes of a wear tracking program, executing on a computing device within the environment of FIG. 1, in accordance with an exemplary embodiment of the present invention.

FIG. 2 illustrates operational processes of a wear tracking program, executing on a computing device within the environment of FIG. 1, in accordance with an exemplary embodiment of the present invention.

In process 210, wear tracking program 115 identifies a part, included in storage device 120, to be assessed. In some embodiments, various parts are assessed by wear tracking program 115 based on a schedule. In some embodiments, this schedule is based on a determined likelihood that a significant amount of wear has been incurred by that particular part during a given time period. In some embodiments, a service professional or another authorized user initiates the execution of wear tracking program 115. In some such embodiments, wear tracking program 115 is configured to verify the authorization of the user to execute one or more of the processes of FIG. 2. In some embodiments, wear tracking program 115 assesses components based on the age of a given component. In some embodiments, wear tracking program 115 assesses components based on a predetermined schedule. In some embodiments, wear tracking program 115 assesses components based on a time since a last assessment was made for a given component. In some embodiments, wear tracking program 115 assesses components based on the availability of computing resources of one or both of computing device 110 and storage device 120.

In process 220, wear tracking program 115 accesses data that corresponds to the identified part, which is included in component wear data 125.

In process 230, wear tracking program 115 analyzes the data of the identified part. In one embodiment, wear tracking program 115 applies a summation to the values included in wear data 125 that correspond to the component. In some embodiments, to determine the amount of wear experienced by a particular part of storage device 120, wear tracking program 115 applies statistical analysis to the values included in wear data 125 that correspond to the component. For example, in one embodiment, the higher the total count from the counters, the more likely it is that a component is in need of replacement or maintenance. In some embodiments and scenarios, a report is generated that indicates whether a type of maintenance is likely to be needed. For example, reports are configured to indicate the likelihood that components need replacement based on a percentile system. In response to such reports, a first company elects to replace components when they reach the ninetieth percentile of needing replacement, while another company elects to replace components when they reach the eighty-fifth percentile of needing replacement. In one embodiment, wear tracking program 115 sums the counts for each zone and uses that sum to determine an amount of wear for a given part.

In process 240, wear tracking program 115 identifies parts, included in storage device 120, that are in need of maintenance. In some embodiments, wear tracking program 115 determines whether one or more thresholds have been met that indicate a given part included in storage device 120 is in need of maintenance. For example, the numeric representation of the amount of wear a part has experienced is above a threshold. As such, wear tracking program 115 identifies that part as needing maintenance.

In some embodiments, multiple instances of wear tracking program 115 that operate using data from multiple storage devices 120 collate maintenance reports to identify parts that are likely in need of maintenance. In some embodiments and scenarios, wear tracking program 115 identifies parts that do not meet one or more standards or specifications for wear based on a difference between expected wear patterns and actual wear experienced by those parts.

In some embodiments, wear tracking program 115 is configured to generating a report indicating the level of wear for various parts (i.e., components), included in storage device 120, based, at least in part, on the counts for a plurality of discrete zones included in data included in component wear data 125. In some embodiments, the report indicates whether the component is in need of replacement. In some embodiments and scenarios, such a report is a message identifying the part and a type of maintenance to be performed on that part. In some embodiments, wear tracking program 115 is configured to schedule a type of maintenance to be performed on parts (components), included in storage device 120.

FIG. 3 depicts a block diagram, 300, of components of computing device 110, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 110 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Wear tracking program 115 and component wear data 125 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Wear tracking program 115 and component wear data 125 may be downloaded to persistent storage 308 through communications unit 310.

I/O interface(s) 312 allows for input and output of data with other devices that may be connected to computing device 110. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., wear tracking program 115 and component wear data 125, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

In the embodiments described with reference to FIGS. 4-9, component wear data 125 includes data that is used by wear tracking program 115 to determine a degree of wear associated with a cable that flexes as robotic accessor 400 moves horizontally. However, this embodiment is not intended to be limiting as the processes described herein can be modified by one skilled in the art such that they are applicable to a variety of types of movement and moving parts included in a given device.

With reference to FIGS. 5-8, in summary, an embodiment of the present invention is described in which the movement of a robotic accessor 400 is tracked within a tape library. Such tracking is achieved by dividing the travel distance in which the robotic accessor can travel into discrete zones that are significantly smaller than the total travel of the robotic accessor. In various embodiments, the size of a given zone is selected such that the number of zones for a given configuration produces adequate counting for tracking component life. However, embodiments of the present invention also recognize that zones that are too small increases the number of counters that have to be stored and managed. Embodiments of the present invention further recognize that large numbers of counters could result in larger data files that consume resources to store count related data and could require higher computing performance to update frequently.

Each discrete zone has a counter associated with it. Each time robotic accessor 400 enters one of these discrete zones the counter associated with that zone is updated to increment the count of the zone. By looking at the total counts associated with each zone, this creates a picture of where the robotic accessor has actually moved within the tape library and the number of wear cycles associated with the particular components can be determined by wear tracking program 115.

Figure 4:
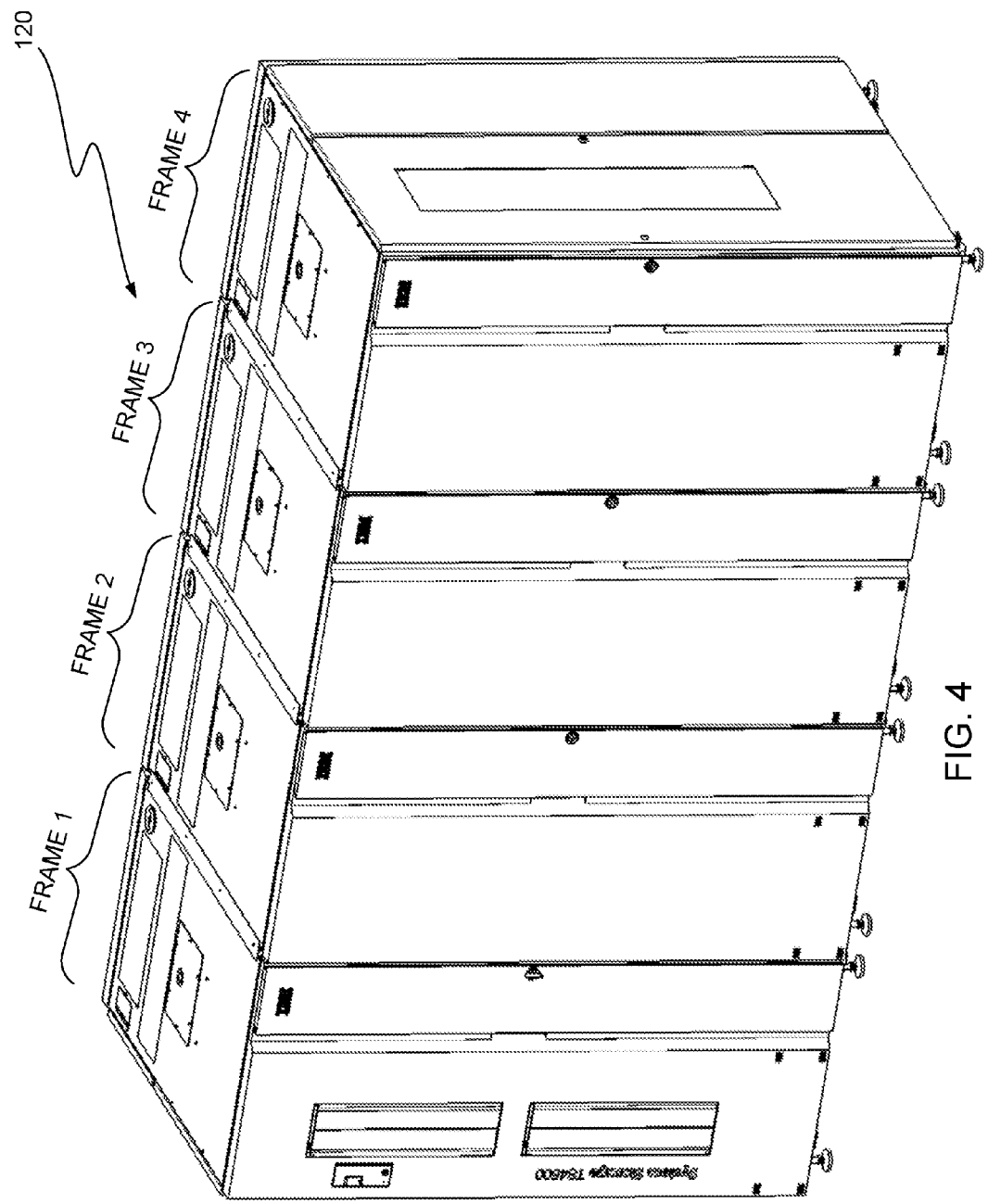
FIG. 4 illustrates a perspective view of a storage device 120, in accordance with an exemplary scenario and embodiment of the present invention.

FIG. 4 illustrates a perspective view of a storage device 120, in accordance with an exemplary embodiment of the present invention. FIG. 5 illustrates a side-cutaway view of a storage device 120, in accordance with an exemplary embodiment of the present invention. In FIG. 5, a horizontal track 410 provides a known path for horizontal direction of movement of robotic accessor 400. As illustrated in FIGS. 5-8, the pathway of horizontal track 410 is segmented into a plurality of zones denoted Z1-Z23. In general, each segment corresponding to zones Z1-Z23 is assigned a counter. Note that, as is understood by those skilled in the art, the direction of movement, i.e., the pathway, that is segmented into discrete zones can vary from one embodiment to the next embodiment. The horizontal direction of movement of robotic accessor 400 as used herein, is used for ease of understanding only, and is not to be interpreted as a limitation for embodiments.

Figure 6:
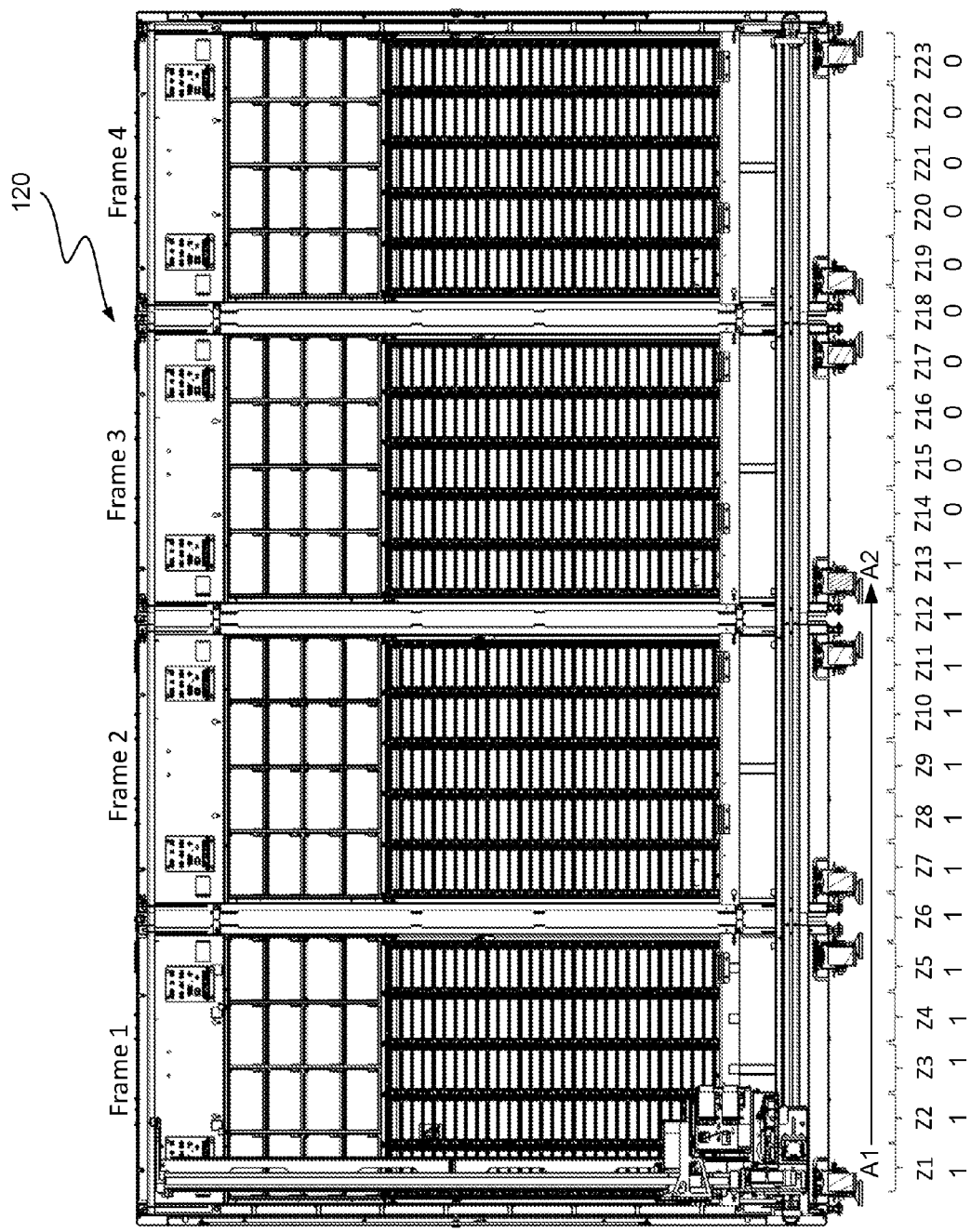

In accordance with one embodiment and scenario, a movement of robotic accessor 400 is illustrated in FIG. 6. As robotic accessor 400 moves to or past a given zone, the count associated with that zone is increased. For example as shown in FIG. 6, robotic accessor 400 moves from point A1 to point A2. As such, robotic accessor 400 moves through zones Z1-Z13. As shown in FIG. 6, a count, represented by a number shown below each zone, is incremented by 1 as robotic accessor 400 moves to or past that given zone. Therefore, the count for each of zones Z1-Z13 is respectively 1. However, the count for zones Z14-Z23 remains at zero because robotic accessor 400 has not yet traveled to or past those zones.

Figure 7:
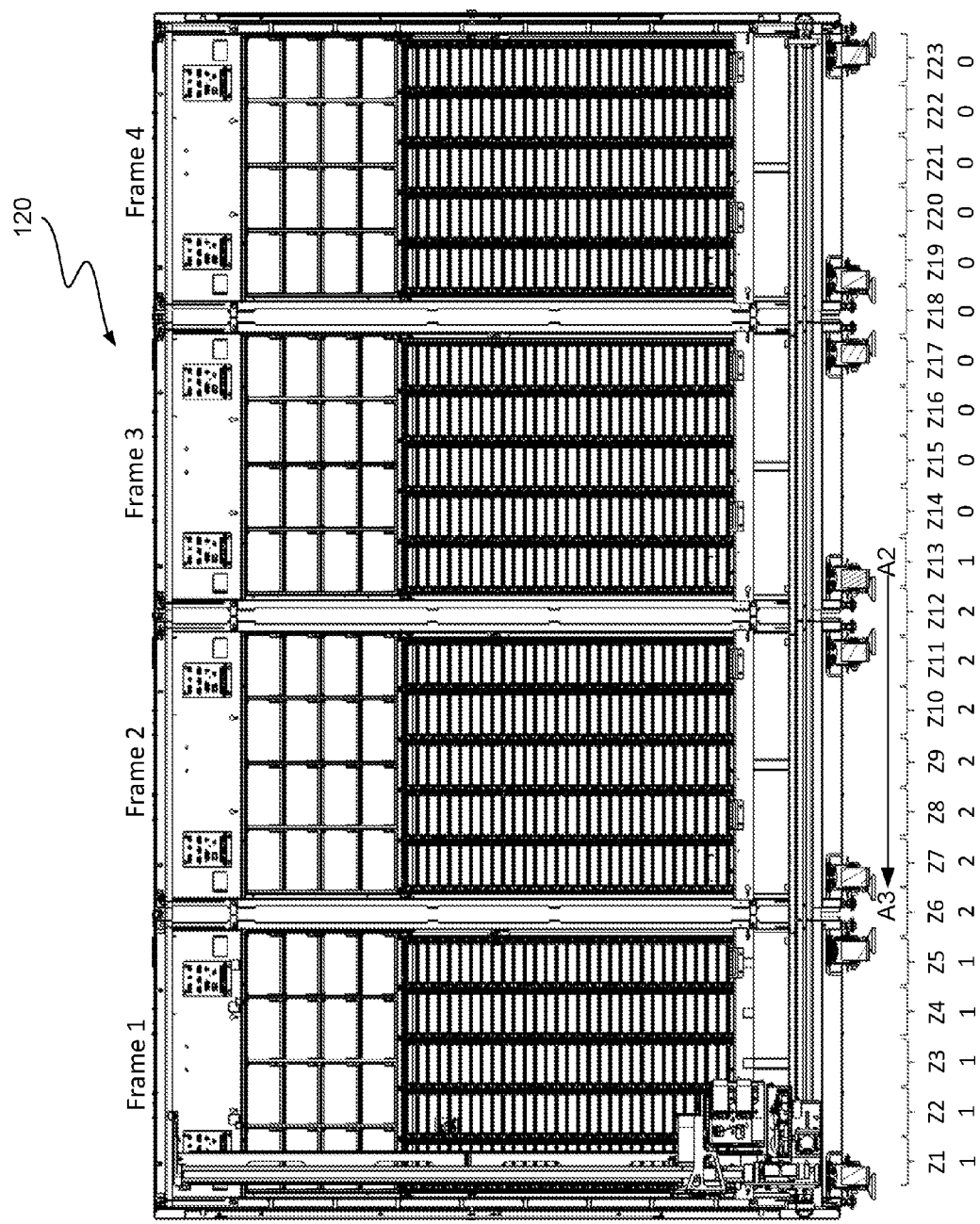

In accordance with one embodiment and scenario, another movement of robotic accessor 400 is illustrated in FIG. 7. In FIG. 7, robotic accessor 400 moves from point A2 to point A3. As such, robotic accessor 400 moves through or to zones Z6-Z13. As shown in FIG. 7, a count, represented by a number shown below each zone, is incremented by 1 as robotic accessor 400 moves to or past that given zone. Therefore, the count for each of zones Z1-Z5 and Z13 remains at 1. However, the count for zones Z12-Z6 is increased to 2 because robotic accessor 400 has moved to or past those zones. Also note that the count for zones Z14-Z23 remains at zero because robotic accessor 400 has not yet traveled to or past those zones.

Figure 8:
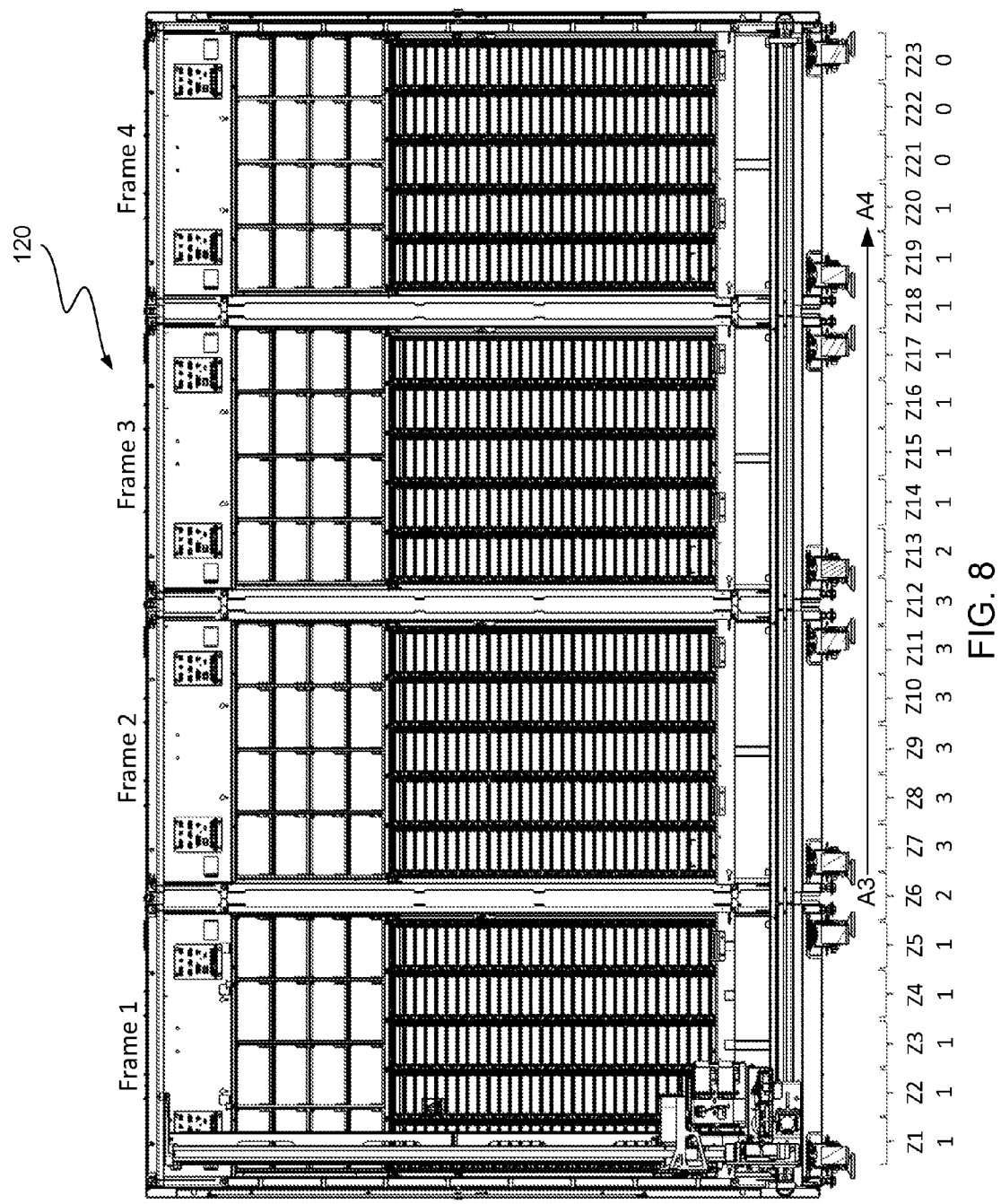

In accordance with one embodiment and scenario, another movement of robotic accessor 400 is illustrated in FIG. 8. In FIG. 8, robotic accessor 400 moves from point A3 to point A4. As such, robotic accessor 400 moves through or to zones Z7-Z20. As shown in FIG. 8, the count, represented by the number shown below each zone, is incremented by 1 as robotic accessor 400 moves to or past that given zone. Therefore, the count for each of zones Z1-Z5 remains at 1. The count for zones Z6 and Z13 is at 2. However, the count for zones Z7-Z12 is increased to 3, Z13 is increased to 2, and Z14-Z20 is increased to 1 because robotic accessor 400 has moved to or pass those zones. Also, note that the count for zones Z21-Z23 remains at zero because robotic accessor 400 has not yet traveled to or past those zones.

When prompted by wear tracking program 115, storage device sends the counts and their associated zones to computing device 110, which saves this information as part of component wear data 125.

In one embodiment, small movements that result in no significant wear are not counted at all. In such embodiments, moves are classified as those that result in wear above a threshold, which are counted, and those that do not, which are not counted. In such embodiments, even if a small move results in crossing from one zone to the next, that move is not counted if the amount of wear associated with that move is below the threshold for being counted. In general, the amount of movement that differentiates whether a movement significantly contributes to the wear of a part varies from one part to another. As such, the threshold for one part may be different than the threshold for a different part. One skilled in the art is able to determine which types of movements significantly contribute to the wear on a part and understand that such thresholds are configured to discriminate between movements that do significantly contribute to wear on a part and those movements that do not.

In one embodiment, a direct correlation is made between the value of the sum and the amount of wear of a given part. In one embodiment, wear tracking program 115 applies an analysis that accounts for small movements of a part included in storage device 120. For example, in one embodiment and scenario storage device 120 determines the degree of change in the flex of a cable based on how many zones were crossed. In this embodiment and scenario, only 1 zone was crossed for a particular movement of a part included in storage device 120. As such, wear tracking program 115 determines that the amount of change in the flex of a cable involved in that movement was twelve percent. Wear tracking program 115 i) adjusts the count for that movement from 1 to 0.12 and ii) uses 0.12 in place of the 1 value in its sum to determine a more accurate representation of the wear of the part. One skilled in the art will recognize that not all movements result in an equal amount of wear and that the amount of wear incurred by a part due to a particular movement can be represented as a partial count. In some embodiments, the counts are incremented by a fraction of a count. For example, a maximum count for wear, i.e., a maximum increment, is 1. As such, a partial increment is any value less than one that represents the amount of wear incurred by a part due to a particular movement that was not large enough to qualify for a full count. In some embodiments, one or more thresholds are to discriminate between movements that are large enough to be counted as a maximum increment; movements large enough to be counted as a less than maximum, but non-zero, increment; and movements that are not large enough to be counted at all, i.e., an increment of zero.

Figure 9:
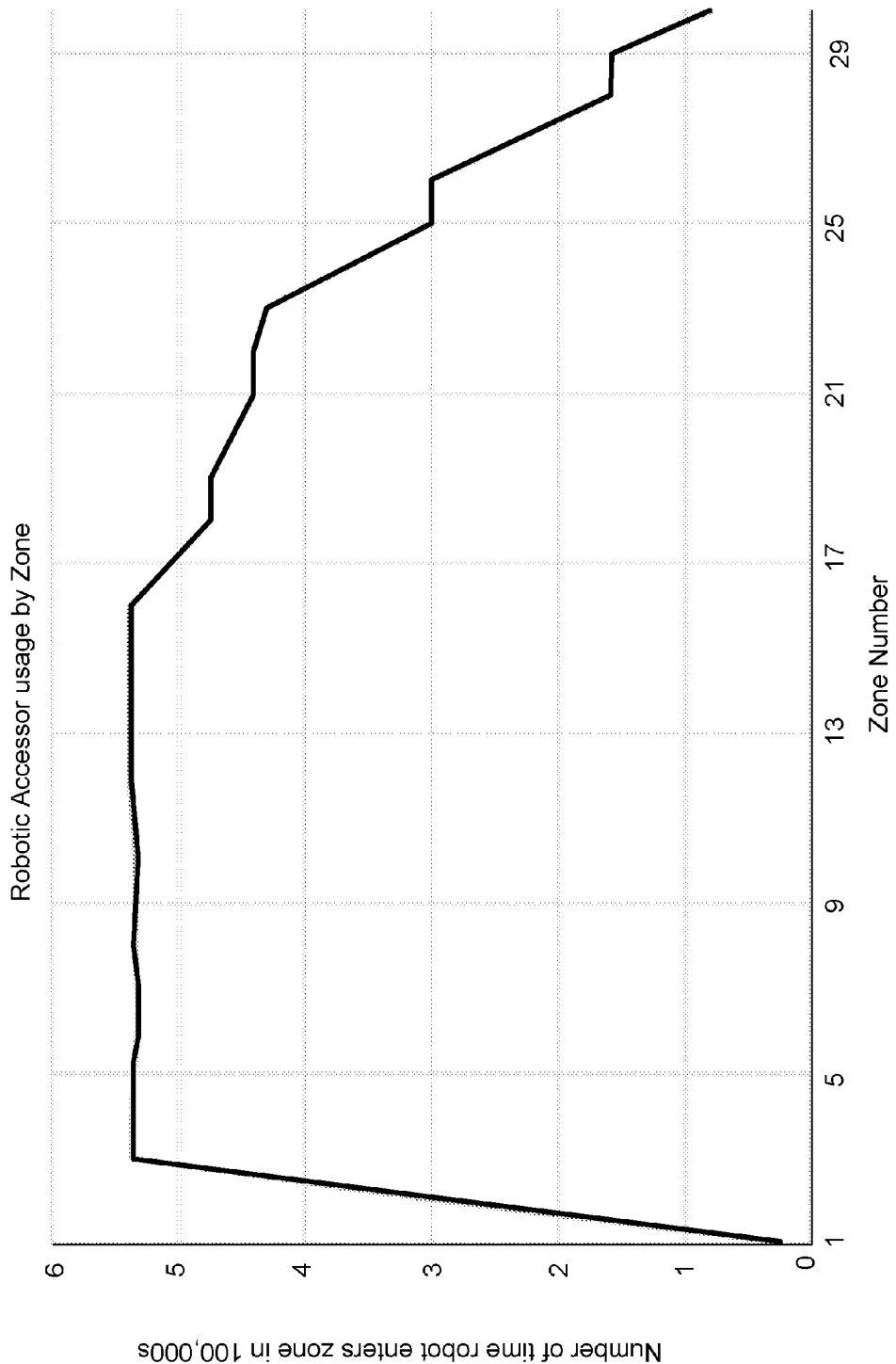
FIG. 9 illustrates a graph of robotic accessor usage by zone, in accordance with an exemplary scenario and embodiment of the present invention.

FIG. 9 illustrates a graph of robotic accessor 400 usage by zone, in accordance with an exemplary scenario and embodiment of the present invention. In some embodiments, once the counters are updated, the results of the counters and zones can be plotted, by wear tracking program 115 such that the amount of counts per zone can be more easily identified, see FIG. 9.

FIG. 9 illustrates how the maximum number of times robotic accessor 400 has entered a specific zone can be identified in order to pinpoint which part of the corresponding robotic components have the least longevity remaining, e.g., the most wear. Also, in some embodiments, wear tracking program 115 is configured to use these plots to identify where the robotic accessor travels most. In some embodiments, wear tracking program 115 used such information to analyze where certain components are to be located or re-located to in storage device 120. For example, wear tracking program 115 used the data to determine where various drives should be located within a tape library to minimize component wear and increase robotic performance. For example, a number of zones are found to be associated with higher than average usage, which in turn is represented by an increase in the wear patterns of a robotic accessor 400. As such, wear tracking program 115 determines that a number of drives that are included in those zones should be relocated such that there is a decrease in the wear experienced by one or more components included in storage device 120. In one such scenario, entire columns of drives, associated with the various zones, are moved en mass such that zones with higher access rates are located more closely together, which in turn reduces the wear on the components of storage device 120.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method for scheduling maintenance on a robotic device based on component wear associated with the robotic device, the method comprising:

dividing, by one or more processors, a direction of travel of a robotic device into a plurality of discrete zones that each have an associated counter that counts how many times the robotic device has entered a given discrete zone, wherein the robotic device is a robotic accessor included in a tape library and the counter is based on robotic accessor position;

updating, by the one or more processors, a count for a first discrete zone in response to the robotic device entering the first discrete zone by:

determining, by the one or more processors, whether a movement, which includes the robotic device entering the first discrete zone, at least meets one or both of a first threshold associated with a level of wear and a second threshold associated with a level of wear;

responsive, by the one or more processors, to a determination that the movement at least meets the first threshold associated with a level of wear, incrementing the count for the first discrete zone; and responsive, by the one or more processors, to a determination that the movement does not at least meet the second threshold associated with a level of wear, determining that the count of the first discrete zone is not to be incremented; and determining, by the one or more processors, a level of wear for a component associated with the robotic device based, at least in part, on a total of counts for the plurality of discrete zones by:

summing, by the one or more processors, counts associated with the plurality of discrete zones to generate a sum of counts;

determining, by the one or more processors, whether the sum of counts at least meets a third threshold indicating a type of maintenance to be performed on the component of the robotic device; and generating, by the one or more processors, a report indicating the level of wear for the component associated with the robotic device based, at least in part, on a total of counts for the plurality of discrete zones, wherein the report indicates whether the component is in need of maintenance or replacement;

responsive, by the one or more processors, to the sum of counts at least meeting the third threshold, sending a message based, at least in part, on the report thereby indicating the type of maintenance to be performed on the component of the robotic device; and scheduling, by the one or more processors, the type of maintenance to be performed on the component of the robotic device based, at least in part, on the report.

* * * * *